June 16, 1953  R. P. HARSHBERGER  2,641,982
EARTHWORKING MACHINE
Filed July 21, 1945  5 Sheets-Sheet 1
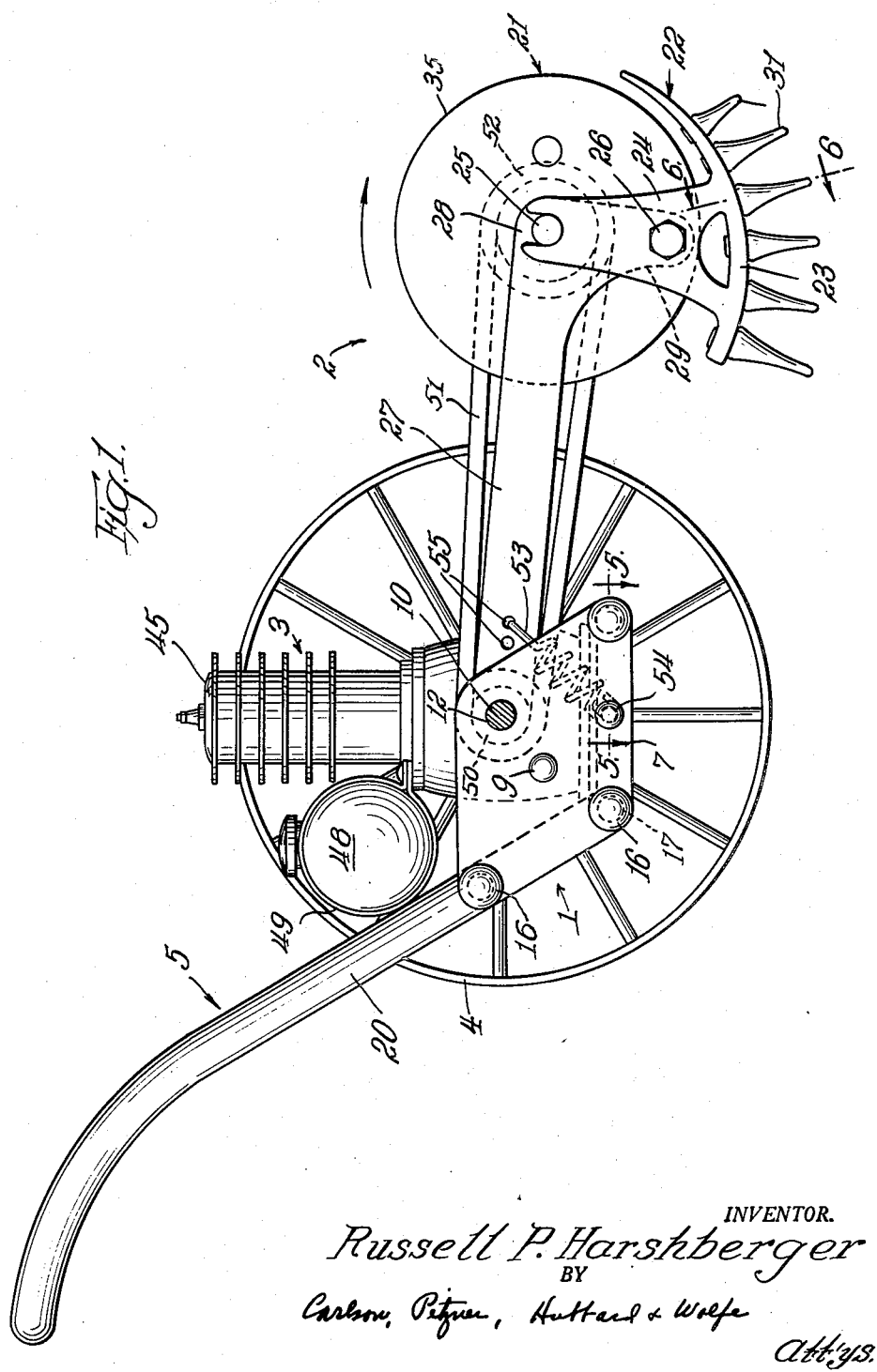
INVENTOR.
Russell P. Harshberger
BY
Carlson, Pitzner, Hubbard & Wolfe
Att'ys.

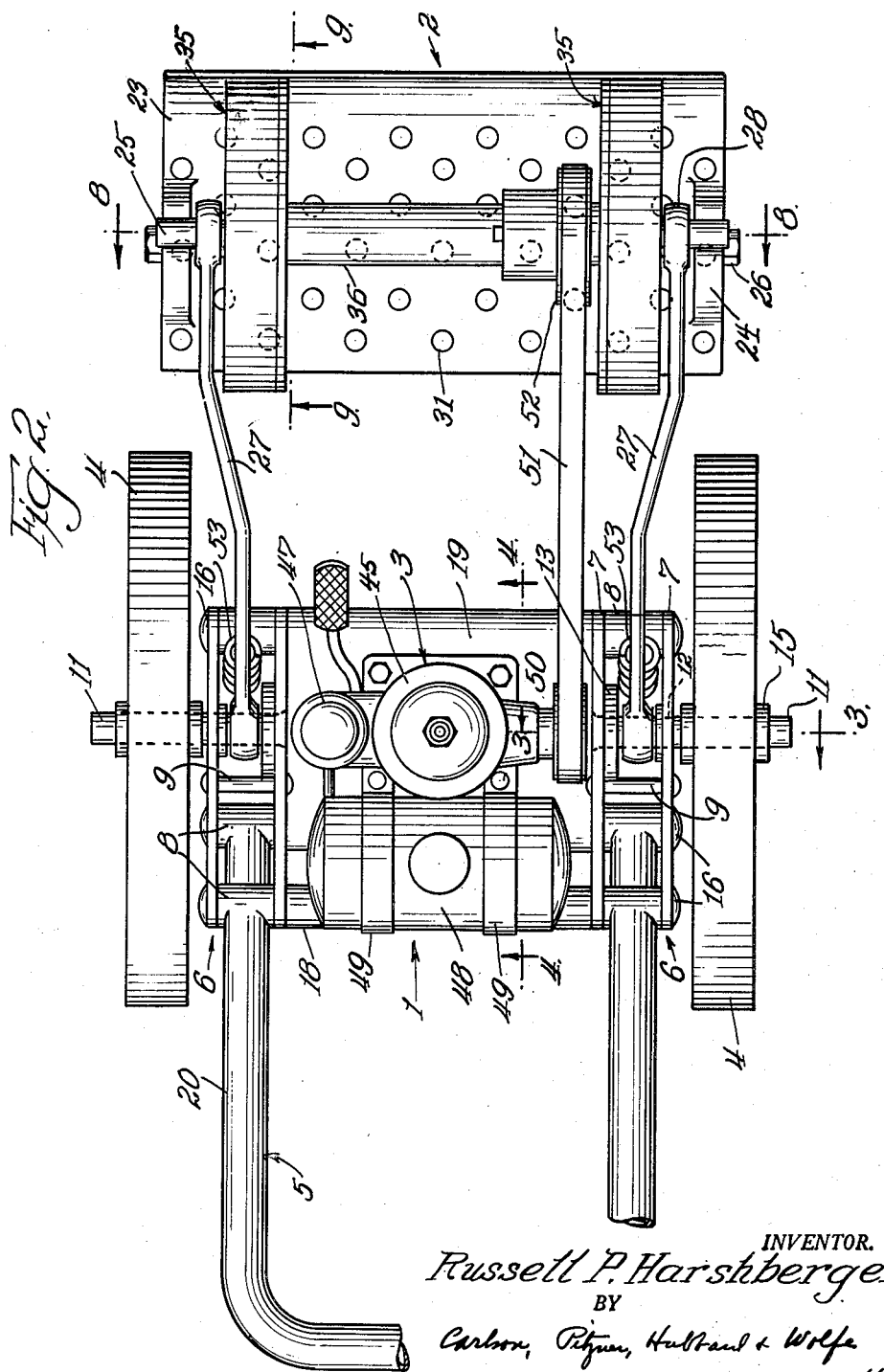

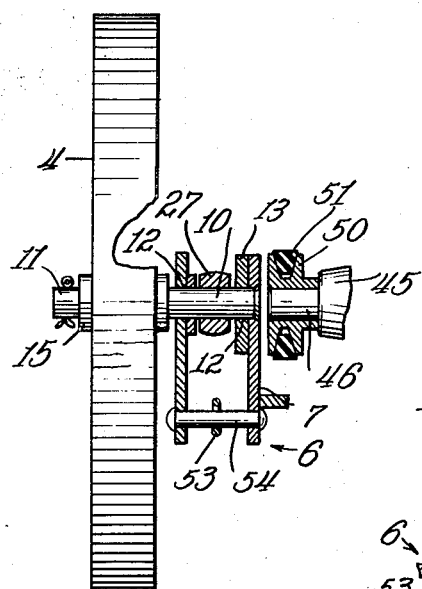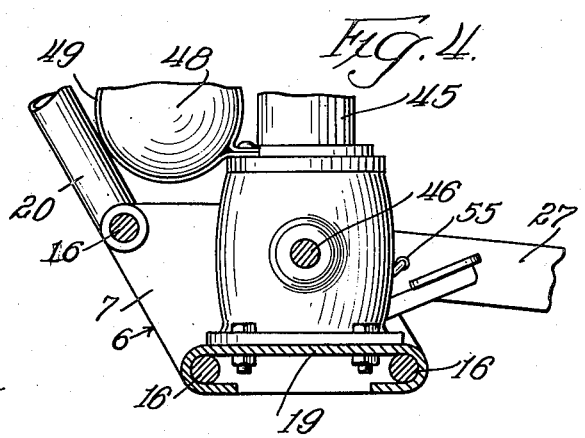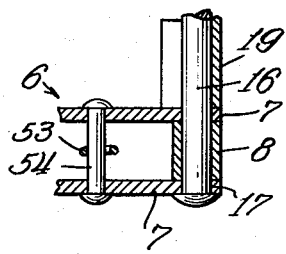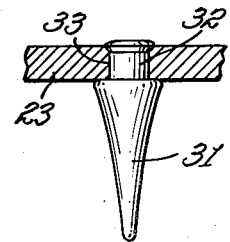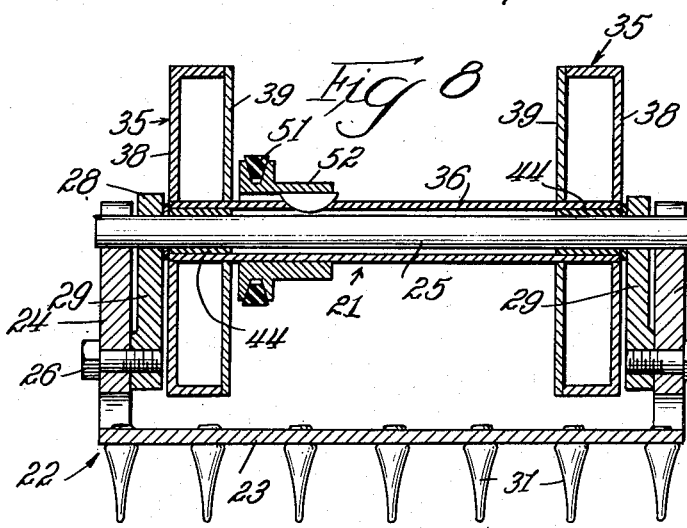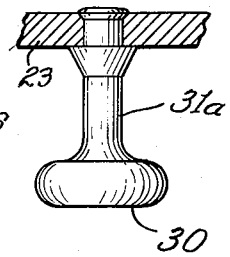
INVENTOR.
Russell P. Harshberger June 16, 1953 R. P. HARSHBERGER 2,641,982
EARTHWORKING MACHINE
Filed July 21, 1945 5 Sheets-Sheet 4

INVENTOR.
Russell P. Harshberger
BY
Carlson, Pitzner, Hubbard & Wolfe
Att'ys.

June 16, 1953     R. P. HARSHBERGER     2,641,982
EARTHWORKING MACHINE
Filed July 21, 1945                                  5 Sheets-Sheet 5
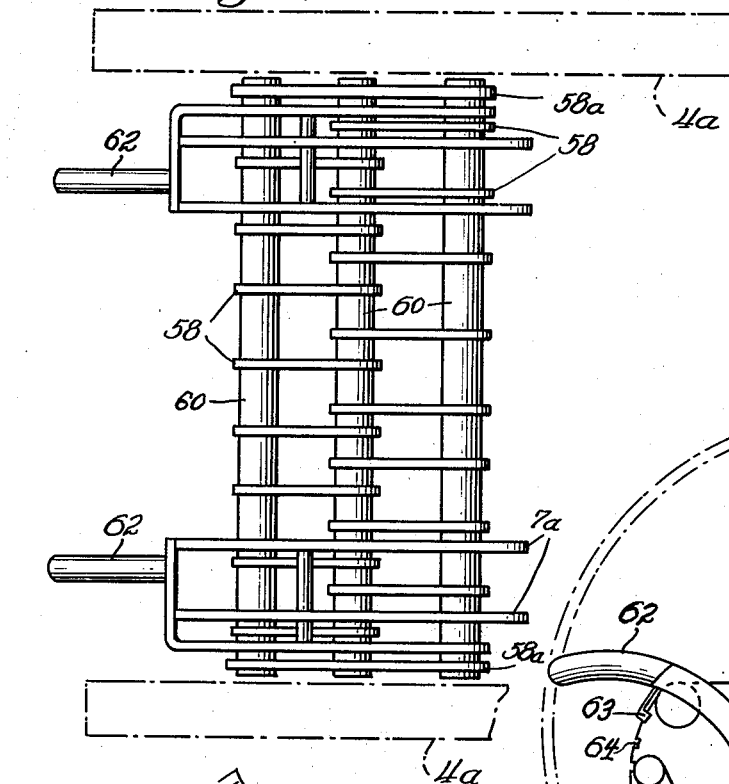
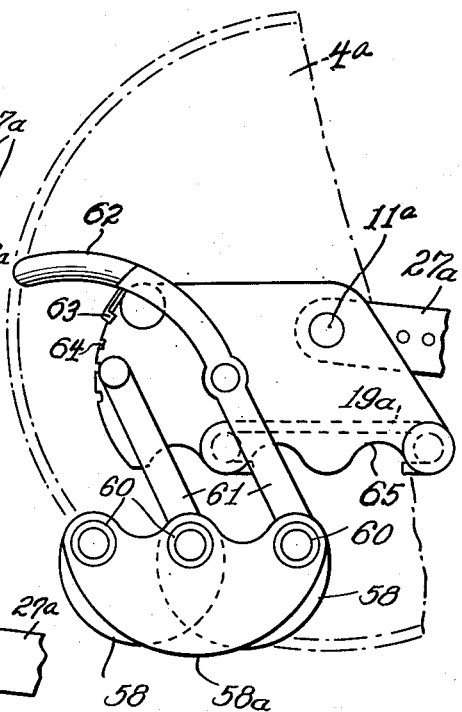
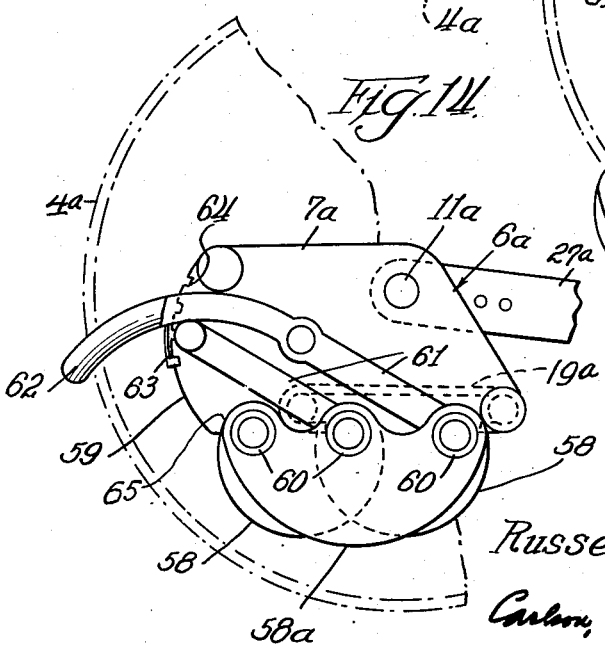
INVENTOR.
Russell P. Harshberger
BY
Carlson, Pitzner, Hubbard & Wolfe
Att'ys.

Patented June 16, 1953

2,641,982

UNITED STATES PATENT OFFICE 2,641,982

EARTHWORKING MACHINE

Russell P. Harshberger, Altadena, Calif.

Application July 21, 1945, Serial No. 606,433

8 Claims. (Cl. 97—45)

The present invention relates generally to improvements in earth working machines, and has particular reference to a new and improved portable machine with a vibrating action for agitating, mulching or physically treating earth surfaces and surfaces of other materials over which it may be operated.

One of the objects of the present invention is to provide a novel earth working machine utilizing an eccentrically-weighted rotary mass for imparting a rapid and powerful vibratory motion to a series of elements arranged to act on the material being worked.

Another object is to provide a new and improved earth working machine of the foregoing character in which the eccentric mass and the material contacting elements are incorporated in a self-contained agitating unit operatively supported from a translatory carriage, and in which the vibrations created by the eccentric mass are not transmitted to any appreciable extent to the carriage, but are confined to the agitating unit for performing useful work.

A further object is to provide a novel earth working machine having an eccentrically weighted rotary mass for imparting a vibratory action to the material working elements, in which the vibratory thrust of the mass tends to effect self-propulsion of the machine, and is subject to adjustment to obtain either a balanced or unbalanced condition depending on operating requirements.

Other and more general objects of the invention are to provide a new and improved agitating implement which is simple and comparatively inexpensive in construction, and which is adaptable to a variety of purposes.

Further objects and advantages will become apparent as the description proceeds.

In the accompanying drawings,

Figure 1 is a side elevational view of an earth working machine embodying the features of the invention.

Fig. 2 is a plan view of the machine.

Figs. 3 and 4 are fragmentary vertical sectional views taken respectively along lines 3—3 and 4—4 of Fig. 2.

Figs. 5 and 6 are fragmentary detail sectional views taken respectively along lines 5—5 and 6—6 of Fig. 1.

Fig. 7 is a view of a modified form of pin adapted for tamping operations.

Fig. 8 is a fragmentary transverse vertical sectional view taken along line 8—8 of Fig. 2.

Figure 9:
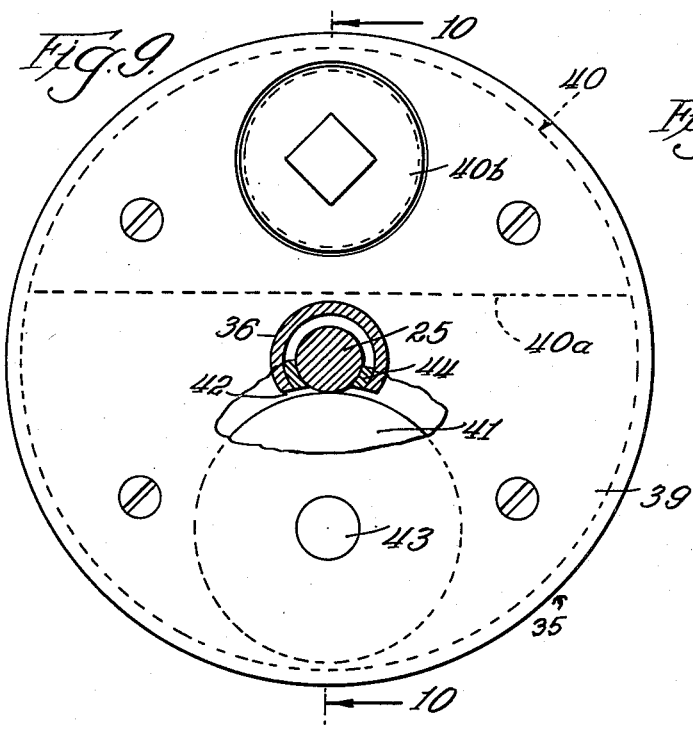

Fig. 9 is a fragmentary vertical sectional view on an enlarged scale taken along line 9—9 of Fig. 2.

Figure 10:
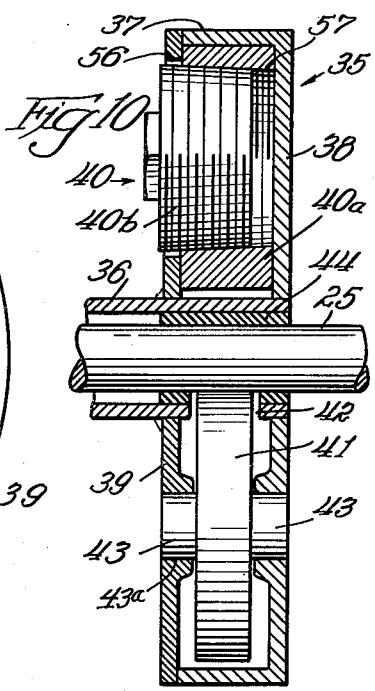

Fig. 10 is an axial sectional view taken along line 10—10 of Fig. 9.

Figure 12:
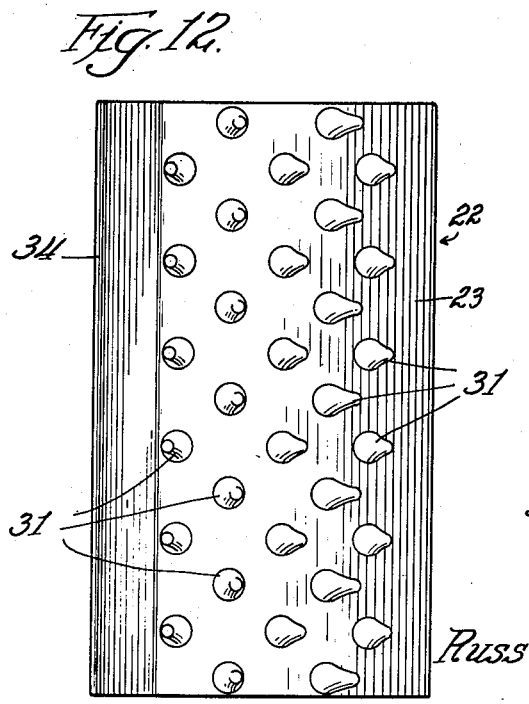
Figure 11:
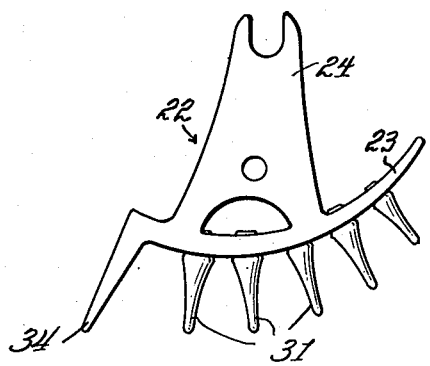

Figs. 11 and 12 are respectively an end view and a bottom view of a modified form of vibrating yoke.

Fig. 13 is a fragmentary plan view of a modified form of machine including a leveling device.

Figs. 14 and 15 are fragmentary end views of the structure shown in Fig. 13, with the leveling device shown respectively in retracted and operative positions.

Referring more particularly to the drawings, the agitating implement, constituting the preferred embodiment of the invention, may be utilized for a variety of purposes, such for example as tamping, chopping or disrupting surface materials, but is especially suitable for soil cultivation and hence shown as an earth working machine. In general, the machine comprises a portable carriage or frame 1 to which an agitator or working unit 2 is operatively connected for translatory movement and for independent vibratory motion, and on which a power plant 3 is mounted for actuating the agitator unit.

The carriage 1 is mounted on wheels 4 preferably for manual propulsion by means of a handle 5, although the agitator unit 2 tends to exert a forward thrust rendering the implement partially self-propelling. In the preferred form, the carriage 1 comprises two spaced end frame structures 6 which are alike in construction, and each of which has the form of an oblique parallelogram. More particularly, each end frame structure 6 consists of two spaced parallel plates 7 separated by spacer sleeves 8 and rigidly connected together in registration by one or more rivets 9. In the present instance, three spacer sleeves 8 are provided, and are located respectively at the two lower corners and at the rear upper corner of the plate assembly.

A stub shaft 10 is rigidly supported in each frame structure 6, and projects outwardly therefrom to constitute an axle 11 for rotatably supporting the associated carriage wheel 4. The shaft 10 may be secured to the frame structure 6 in any suitable manner, and in the present instance extends snugly through alined bores 12 in the plates 7 adjacent forward upper corners. The extreme inner end of the shaft 10 is peened against the inner plate 7, and a disk 13 rigidly fixed thereon is suitably secured, as by welding, against and to the outermost surface thereof. The associated wheel 4 has a central hub 15 rotatably confined on the outer axle portion of the axle 11.

The two end frame structures 6, with the respective wheels 4 mounted thereon, are suitably connected in spaced relation to complete the carriage assembly. In the present instance, three tie rods 16 are provided for this purpose, and extend respectively through the alined sets of spacer sleeves 8 and registering openings 17 in the parallel plates 7. The uppermost rod 16 also extends through an elongated spacer sleeve or tube 18 interposed in end abutting engagement between the inner plates 7 of the frame structures 6. A generally horizontal plate 19 extends across the two lower tie rods 16 in end abutting engagement between the inner plates 7, and is curled downwardly around the rods at its rear and forward edges. The extreme outer ends of the tie rods 16 are upset or riveted against the outer plates 7 of the end structures 6. Thus, the end structures 6 are rigidly connected by the tie rods 16, and are held in spaced relation by the tube 18 and the plate 19.

The operating handle 5 may be of any conventional form, and in the present instance is generally U-shaped, with legs 20 rigidly attached respectively to the end frame structures 6, and extending upwardly and rearwardly therefrom. Preferably, the lower ends of the legs 20 are rigid or integral with the two rearmost sets of spacer sleeves 8 so as to provide a double attachment of each leg to the frame or carriage 1.

The agitator unit 2 comprises an operating head 21 connected to the carriage 1 for translation therewith, and for free or independent oscillatory motion generally vertically. In the preferred form, the head 21 includes a vibrating yoke 22 consisting of a horizontal cross member 23 and two upwardly extending arms 24 at opposite ends. A fixed shaft 25 extends through and between the upper ends of the arms 24 in parallel relation to the yoke member 23.

The yoke 22 is pivotally suspended forwardly of the carriage 1 by two spaced radius rods 27 which are journaled at their trailing ends respectively on the shafts 10 between the plates 7 of the end frame structures 6. At their forward ends, the rods 27 are rigidly connected to the arms 24 of the yoke 22. Thus, each rod 27 has an end bearing 28 receiving the fixed shaft 25, and a depending leg 29 secured, as by means of a screw bolt 26, to the inside of the adjacent yoke arm 24 to secure the parts in assembled relation. The yoke 22 is substantially of the same width as the carriage 1, and normally is adapted for engagement with the surface of the material to be worked. However, upon tilting the carriage 1 rearwardly by depressing the handle 5, the forward spacer sleeves 8 can be brought into engagement with the undersides of the radius arms 27 to lift or elevate the operating head 21 positively away from the underlying surface.

The operating head 21 may be of any desired construction adapted for the particular work to be performed. In the present instance, the cross member 23 of the yoke 22 is arcuate in shape transversely of the overhead shaft 25, and provides a support for a plurality of downwardly projecting pins 31 arranged in closely spaced relation over the underside. To secure the pins 31 conveniently to the yoke 22, each is provided with a reduced shank 32 extending through one of a pattern of holes 33 opening through the cross member 23, and peened or upset against the top surface of the member.

The pins 31 constitute the elements which act on the material being worked, and may be provided in any one of various shapes best adapted for the particular operation to be performed. Thus, when the machine is to be used as a cultivating implement, the pins 31 preferably are tapered to a blunt point as shown in Fig. 1. For tamping operations, pins 31$^a$ with blunt flat heads 30 (see Fig. 7) may be substituted. In Figs. 11 and 12, the trailing edge of the plate or cross member 23 is additionally provided with a longitudinal downwardly extending knife 34 for chopping or cutting surface trash, such as straw, leaves or corn stalks, to mulch the latter with the soil. Preferably, the cross member 23 curves upwardly and forwardly to facilitate forward movement of the head 21 over any rises or undulations in the surface being worked.

Means is provided for imparting a vibratory action to the operating head 21, and in the present instance this means comprises two eccentrically-weighted flywheels 35 rotatably mounted on opposite ends of the fixed shaft 25, and arranged to be driven, in any angular position of the radius rods 27, from the power plant 3 on the carriage 1. The flywheels 35 are preferably alike in construction, and are rigidly secured respectively to opposite ends of a driving tube 36 supported for rotation in concentrically spaced relation about the shaft 25 between the radius rods 27. Preferably, each flywheel 35 comprises a hollow cylindrical housing 37 having an integral outer side wall 38 and a separable inner wall or face plate 39. The plate 39 is welded to the tube 36, and the outer section of the housing 37 is bolted to the plate. An eccentric weight 40 is mounted within the flywheel 35 at one side of the tube 36. Journaled within the flywheel 35 in a position diametrically opposite the eccentric weight 40 is a radial thrust roller 41 projecting through an opening 42 in the tube 36 for bearing engagement with the periphery of the shaft 25. The roller 41 has two opposite stub shafts 43 journaled respectively in two internally flanged bearing openings 43$^a$ in the side walls 38 and 39 of the flywheel 35. To maintain the flywheel 35 substantially in centered position when idle, a partial sleeve bearing 44 is interposed between the interior surface of the tube 46 and the fixed shaft 25, and extends closely to opposite sides of the thrust roller 41.

The power plant 3 for driving the flywheels 35 may be of any suitable character, and in the present instance comprises a gasolene engine 45 mounted on the flat plate 19 of the carriage 1, and having a crank shaft 46 extending to one side thereof in coaxial alinement with the shafts 10 and in parallel relation to the axis of the tube 36. The engine 45 may be supplied with fuel through a carburetor 47 from a fuel tank 48 supported at opposite ends by straps 49 from the engine crank case. A pulley 50 on the engine shaft 46 is connected through a belt 51 with an alined pulley 52 keyed to the driving tube 36.

In operation, the engine 45 serves to drive the flywheels 35 at a comparatively high speed, and the latter, by reason of their eccentric weights 40 and contact through the thrust rollers 41 with the fixed shaft 25, act to impart a strong gyratory motion to the operating head 21. When the handle 5 is elevated to release the radius rods 27 for free oscillatory movement in response to the gyratory motion, the yoke 22 with the pins 31 will be vibrated to penetrate and work the surface over which the machine is operated. The vibratory action is not transmitted to the carriage 1, but is confined to the operating head 21.

Since the rods 27 and the engine shaft 46 are located on a common axis, a uniform tension is maintained on the drive belt 51 in all positions of the head 21. Each time the pins 31 leave the surface being worked at the top of the amplitude of vibratory motion, the revolving eccentric weights tend to exert a forward thrust, and thus to render the machine self-propelling. It will be understood that the machine may be additionally propelled and guided in direction by use of the carriage handle 5.

In order to limit and control the amplitude through which the head 21 is vibrated, the radius arms 27 are urged downwardly by spring pressure. More particularly, two coiled tension springs 53 are anchored respectively at their lower ends to fixed pins 54 in the end frame structures 6 and at their upper ends to the associated radius rods 27. To permit adjustment of the spring pressure, the upper end of each spring 53 may be removably engaged selectively in either of two apertures 55 formed in the associated radius rod 27 at different distances from the pivotal axis. The springs 53 not only prevent the rods 27 from moving upwardly too great a distance, but also absorb the upward thrust to impart an added force on the down thrust.

The eccentric weights 40 may be of any desired character, and preferably are constructed to permit adjustment of their mass and thereby to vary and balance the pounding force. In the preferred form, each weight 40 comprises a fixed chordal segment 40ª confined within one side of the flywheel housing 37, and a plug 40ᵇ removably inserted through an opening 56 in the cover plate 39 into a central recess 57 in the segment. To secure the plug 40ᵇ in position, it may be screw threaded. By reason of the foregoing construction, plugs 40ᵇ of different weights may be substituted to vary the total mass of the weights 40, and plugs 40ᵇ of the same or different weights may be inserted in the two flywheels 35 to control the balance of force. This is of particular advantage, for example in instances where the carriage wheel 4 on one side may be required to move over soil in a different condition than that underlying the wheel on the other side. In more extreme cases of unequal operating conditions, only the plug 40ᵇ for one flywheel 35 may be inserted while the corresponding plug for the other flywheel is left out.

The machine is adaptable to a variety of purposes. Thus, it may be used for mixing materials or tamping soil or concrete. It is especially suitable for use as a soil cultivator. In this connection, the form of yoke, illustrated in Figs. 11 and 12, with the transverse knife 34 is adapted for chopping up trash, such as straw, leaves, cornstalks, and grain stubble, and to mulch the latter with the soil. Advantage may also be taken of the chopping action by providing the yoke 22 in the form of a pick adapted for use in mining or excavating operations.

When constructed for use as a cultivating implement, the machine may also be provided wtih an auxiliary surface leveling device. Thus, in the modified form shown in Figs. 13 to 15, a plurality of drag elements 58 and 58ª are mounted on the underside of the carriage 1. In general, the main construction of the implement is the same as in the first form, and hence corresponding parts are identified by the same reference numerals plus the letter *a*.

In the modified form, the end frame parallelogram structures 6ª are slightly changed in shape to provide an arcuate surface 59 on the trailing end, and the axles 11ª are extended to increase the spacing of the wheels 4ª so as to accommodate the outermost drag elements 58ª. In the present instance, the drag elements consist of circular knives extending longitudinally of the direction of movement, and mounted on the carriage 1ª for movement either into retracted inoperative position or lowered operative position. The supporting means comprises three parallel tubes 60 which extend crosswise of the carriage 1ª in a generally horizontal plane, and to which the upper portions of the knives are rigidly connected so as to constitute a rigid frame. More particularly, the inner knives 58 are comparatively short and connected in alternately staggered relation respectively to the two rearmost tubes 60 and the two foremost tubes, while the outer end knives 58ª are relatively long and connected to the opposite ends of all three supporting tubes. The two series of short knives 58 and the long knives 58ª are thus connected in a rigid unitary assembly adapted to constitute a rake, drag or harrow.

To provide an adjustable support for the leveling device, each end is pivotally suspended by two parallel links 61 from the adjacent end frame structure 6ª. In the present instance, the links 61 are normally inclined, and are pivotally connected at their lower ends to the two foremost tubes 60, and at their upper ends to the outer plates 7ª. The foremost links 61 are extended rearwardly of their fixed pivots to provide operating handles 62 having releasable pawl detents 63 for engaging respectively with locating notches 64 formed in the arcuate end surfaces 59 of the inner plates 7ª.

When the handles 62 are depressed, the knife assembly is retracted away from the ground surface into inoperative position as shown in Fig. 14, and is held in this position by the detents 63. In this position, the tubes 60 seat in arcuate notches 65 in the lower edges of the frame structures 6ª. To lower the knife assembly into operative position, as shown in Fig. 15, the detents 63 are disengaged from the notches 64, and the handles 62 are raised. When the rake knives 58 and 58ª alone are to be used for cultivation, the carriage 1ª may be tilted to lift the operating head away from the ground surface, and then the eccentrically-weighted flywheels will be effective to impart a backward and forward sliding movement.

When the leveling device is provided, the machine may be used with the vibratory head operative either in elevated or lowered position. In either condition of use, the leveling device when lowered into operative position serves as a stabilizer for the machine as a whole against the vibrations set up by the head. Alternatively, the leveling device can be used without the vibratory head in which event the latter may be disconnected and removed from the machine.

I claim as my invention:

1. A machine of the class described comprising, in combination, a tiltable carriage having two supporting wheels and an operating handle, a support pivotally mounted on said carriage for translation therewith and extending therefrom for free vertical swinging movement, an operating head mounted on and depending from the outer end of said support, a revoluble eccentric mass mounted on said head, a motor supported on said carriage, drive means connecting said motor to said eccentric mass to revolve said mass in all angular positions of said support to impart a vibratory action to said head, a leveling rake, and shiftable mounting means including a plurality of stiff links interconnecting said carriage and said rake for supporting the latter alternatively in a raised inoperative position and a lowered operative position having a fixed positional relationship to said carriage.

2. A machine of the class described, comprising, in combination, a carriage having side frame members rigidly interconnected by a plurality of spaced parallel tie rods, two of said rods being located in a generally horizontal plane adjacent the lower margins of said side frame members, a generally horizontal plate extending across and rigidly interconnecting said two lower tie rods, wheels having axle supports on said side frame members, an operating handle connected to said side frame members for swivelling said carriage on said wheels, forwardly-projecting parallel spaced radius rods swivelled at their rear ends respectively on said side frame members above and behind one of said tie rods, said one tie rod being operable to engage the underside of said radius rods to lift the latter into raised position upon rearward tilting movement of said carriage, an operating head mounted on and depending from the forward ends of said radius rods, said head having a working member for contacting the underlying earth over which the machine is translated and a rotary eccentric mass for imparting a vibratory motion to said member, and a motor supported on said plate and operatively connected to said mass to revolve the latter.

3. A machine of the class described comprising, in combination, a carriage having support wheels, parallel radius rods pivotally mounted on said carriage for translatory movement therewith and extending forwardly thereof for vertical swinging movement, a transverse shaft extending between and mounted on the forward ends of said rods, eccentric means mounted about said shaft, power means connected to said eccentric means to energize said means for causing vibration of said shaft, support members on the forward ends of said rods disposed in offset relation to said shaft, a work tool detachably secured to the forward ends of said rods, said tool including a yoke having a horizontal cross member with working elements on the underside thereof and two upwardly extending arms attached to opposite ends of the cross member, means for securing one portion of each arm to said respective support members of said rods, and a second portion of each of said arms being adapted for abutting engagement with the underside of said shaft so that downward motion of said shaft is directly imparted to said arms and said tool.

4. An earth working machine comprising, in combination, a carriage having support wheels, parallel radius rods pivotally mounted on said carriage for translatory movement therewith and extending forwardly thereof for vertical swinging movement, a transverse shaft extending between and fixedly mounted in oppositely disposed bearings on the forward ends of said rods, an eccentric weight rotatably mounted about said shaft, power means connected to said eccentric weight for causing rotation thereof to produce vibration of said shaft, a downwardly extending support leg on the forward end of each of said rods disposed beneath said shaft, a work tool detachably secured to the forward ends of said rods, said tool including a yoke having a horizontal cross member with working elements disposed on the underside thereof and two upwardly extending arms attached to opposite ends of the cross member, means for detachably securing an intermediate portion of each arm to said respective support legs of said rods, and the upper end of each of said arms being notched to engage said shaft so that downward motion of said shaft is directly imparted to said arms and said tool, the notched construction of said arms cooperating with said shaft and said detachable securing means to maintain said tool in assembled position.

5. An earth working machine of the class described comprising, in combination, a carriage having support wheels, parallel radius rods pivotally mounted on said carriage for translatory movement therewith and extending forwardly thereof for vertical swinging movement, vibrating means supported on the forward ends of said rods for causing vibrating movements thereof, means forming a support lug on the forward end of each of said rods, a support member on the forward end of each of said rods disposed in offset relation to said respective lugs, a work tool detachably secured to the forward ends of said rods, said tool including a yoke having a horizontal cross member with working elements disposed on the underside thereof and two upwardly extending arms attached to opposite ends of the cross member, means for detachably securing an intermediate portion of each arm to said respective support members of said rods, and the upper end of each of said arms being notched to engage said respective lugs to form a solid connection between said arms and said rods for transmitting downward movement of said rods to said tool and for cooperating with said detachable securing means to maintain said tool in assembled position.

6. A machine of the class described comprising, in combination, a tiltable carriage having two spaced end frames at opposite ends thereof, axles extending outwardly from said frames, wheels on said axles, handle members connected to said frame members and extending rearwardly for affording control of said machine, means interconnecting said frame members for maintaining said members in spaced relation, said interconnecting means including a tie member extending between the lower forward sections of said frame, two substantially parallel radius rods pivotally mounted on said respective frames above and behind said tie member, said rods extending forwardly of said carriage for vertical swinging movement, an earth working tool mounted on and depending from the forward end of said rods, vibrating means on the forward ends of said rods for causing vibratory movements of said tool, and spring means interconnecting an intermediate portion of one of said rods with a lower portion of one of said frame members, said tie member being operable to engage said rods upon rearward tilting movement of said carriage for lifting the forward ends of said rods and said tool.

7. A machine of the class described comprising, in combination, a tiltable carriage having two supporting wheels and an operating handle, a support pivotally mounted on said carriage for translation therewith and extending therefrom for free vertical swinging movement, an operating head mounted on and depending from the outer end of said support, spaced working elements disposed beneath said head, a revoluble eccentric mass mounted on said head, a motor supported on said carriage, drive means connecting said motor to said mass to revolve said mass in all angular positions of said support to impart a vibratory action to said head, a leveling rake mounted on said carriage and comprising a series of knives transversely alined along the underside of said carriage and having edges extending in the direction of translation, means for connecting said knives in a rigid assembly, and stiff link rigidly supporting said assembly from said carriage in fixed relation thereto for cultivating the surface traversed by the carriage.

8. An earth working machine comprising, in combination, a translatory carriage, an earth working implement including a generally horizontal plate curved to define a convex generally cylindrical face on the lower side thereof, said face having a longitudinal disposition transverse to the direction of translation of said carriage and presenting an upturned portion on the side thereof corresponding to the forward direction of carriage movement, a plurality of spaced earth working elements attached to said plate and projecting downwardly from said face for cultivating the surface traversed by said carriage, support means including a movable head mounted on said carriage and supporting said implement for vertical translation relative to said carriage, said head having restraining means engaging said implement for precluding horizontal movement of said earth working elements relative to the head and a power rotated eccentric weight mounted on said head to rotate about a substantially horizontal axis for imparting vibratory motion to said implement.

RUSSELL P. HARSHBERGER.

References Cited in the file of this patent

UNITED STATES PATENTS

| Number | Name | Date |
|---|---|---|
| Re. 20,663 | Cameron | Mar. 1, 1938 |
| 962,508 | Hiett | June 28, 1910 |
| 1,145,240 | Gouldh | July 6, 1915 |
| 1,248,257 | Brown et al. | Nov. 27, 1917 |
| 1,345,532 | Cass | July 6, 1920 |
| 1,458,655 | Jahn | June 12, 1923 |
| 1,932,112 | Lindgren | Oct. 24, 1933 |
| 1,956,897 | Gept | May 1, 1934 |
| 2,042,156 | McCrery | May 26, 1936 |
| 2,248,182 | Mateer | July 8, 1941 |
| 2,323,479 | McCullough | July 6, 1943 |

FOREIGN PATENTS

| Number | Country | Date |
|---|---|---|
| 441,228 | Great Britain | Jan. 15, 1936 |